United States Patent Office 2,837,341
Patented June 3, 1958

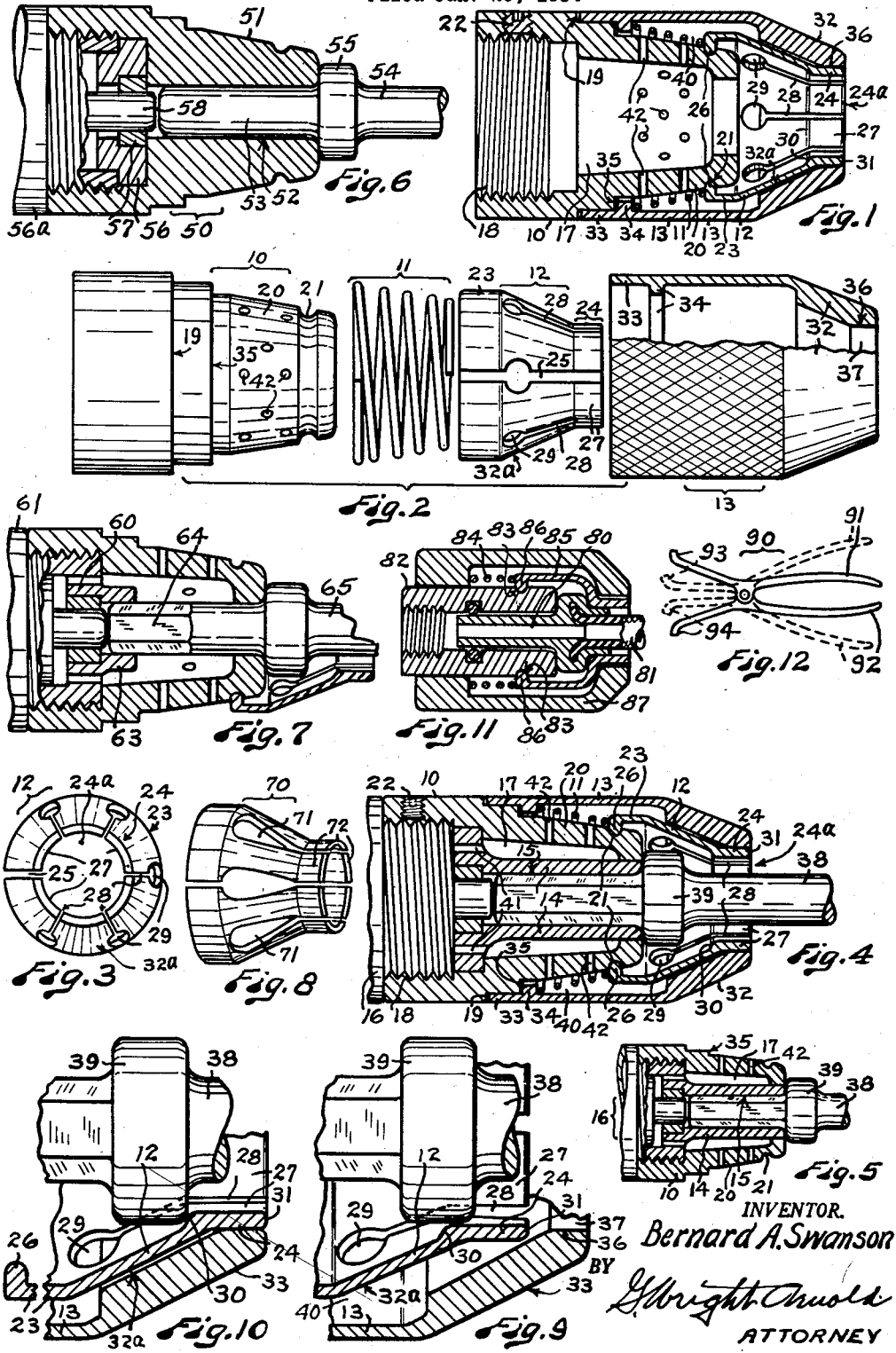

2,837,341

AUTOMATIC SAFETY CHUCK OR CONNECTOR-COUPLER

Bernard A. Swanson, Sacramento, Calif.

Application January 29, 1954, Serial No. 407,093

16 Claims. (Cl. 279—19.7)

My invention relates to an automatic self-locking safety chuck or connector-coupler. More particularly my invention relates to an automatic self-locking safety chuck or connector for securing tools in motors characterized by having reciprocating pistons or motion where particularly exacting requirements are involved, as well as in joining units securely in simple connection where exacting requirements are not involved.

For purposes of definiteness and clearness of description and illustration, I set forth my invention as adapted to functioning as a chuck or a connector-coupler for securing a tool in a fluid pressure engine characterized by having a reciprocating motion. However, it is to be understood that the invention is not limited to any such specific application. Among other applications of the device of my invention, the following may be cited by way of illustration and not by way of limitation: as connector-coupler (1) for fluid conducting hoses of various types; (2) for joining cables used in various capacities as in towing or generally where a quick coupling or uncoupling is desired; (3) for joining rods to be extended or where quick disassembling is involved; (4) for manufacturing processes on endless transferring chains where articles are to be temporarily and securely held as in dipping for painting or other processing and quick coupling and uncoupling is involved; (5) for quick coupling as in automobile and airplane factories for transferring automobile or airplane parts as bodies or motors or the like from one department to another; and (6) for use in the hoisting and lowering rigging for loading and unloading ships.

Hereinafter, in the interest of brevity, the automatic safety chuck or connector-coupler of my invention will be referred to by the single term "chuck."

In chucks of common practice design for removably securing tools in operating relationship to the motor or engine having reciprocating motion, there is involved, in installing or connecting of the tool with the motor, a separate operating step on the part of the operator in applying the tool to render the chuck in safety locking position in locking the tool against unintentional release or discharge from the chuck. It is a primary object of my invention to provide a chuck characterized by the construction wherein the mere simple act of applying or installing the tool, such as a chisel, rivet-set, peening or other like reciprocating driven member to and in the chuck will positively automatically lock the tool or other unit in operative position without any special attention or separate operation on the part of the operator.

In chucks or connector-couplers of common practice and design, the means of locking the tool in position in the chuck mechanism mounted on the motor, generally involves the tightening of a screw by a screw driver or using a wrench or a key in some capacity so that it means a separate and special operation on the part of the operator. In the prior art chuck devices, where such tools are not required as in ball bearing locking chucks, an outer sleeve must be turned to put the chuck in locking position. In contrast to all such separate and special operations in the chucks, generally of the prior art in use to place them in locking position, the mere assembly of the tool in the chuck of my invention results in such tool being automatically fully locked in the chuck so that it is practically impossible for the tool to be accidently or unintentionally discharged or thrown from engagement with the chuck.

Failure of the operator, in connection with the prior art devices, to perform the said special or separate act of locking the tool in the chuck, whether due to oversight or forgetfulness, may result in the tool being violently discharged from the chuck as soon as the highly compressed fluid is admitted to the engine, as in a reciprocating piston engine. This may be attended with serious and considerable danger to the operator and also to fellow workmen. Operators or fellow workmen have been known to be killed by such unintentionally released or discharged tools.

It is a primary object of my invention to provide a chuck which will positively eliminate this human factor of forgetfulness in locking the device, and thereby provide a positively automatic safety chuck which will positively insure the safety not only of the operator but of the fellow workmen of the operator of the particular fluid pressure mechanism.

A further requirement in a chuck is that the operation of the same shall be of such simplicity that the tool may be applied or installed in the operating mechanism with speed and without any prolonged period involved in such attaching operation. Not only must the chuck permit a ready application of the tool, but it must be equally readily detachable. Accordingly, it is a primary object of my invention to provide a chuck which not only insures the safety element above described, but also provides for a quick application of a tool to the operating mechanism, and likewise, for a quick detachable operation in removing the tool from the mechanism as may be required, especially when a change of tools is involved, or in the case of an emergency of small or large magnitude.

Furthermore, it is a primary object of my invention, to provide a chuck characterized by its simplicity of construction, and likewise, economy in manufacture. For clearness of illustration and definiteness of disclosure, I will set forth my invention as applied to a fluid pressure operated engine or motor and one which places the chuck under extreme test, that is, in a mechanism where the piston is reciprocating at high speed or frequency and great force, so that when the tool is so driven, it is particularly important that the tool be positively automatically locked into position securely as a safety factor.

By way of briefly, and therefore incompletely, setting forth the invention the following may be stated: In providing an automatic safety chuck embodying my invention, fundamental features characterizing the same are the providing of an axial end opening in the outer shell locking member having an opening of fixed diameter; next is provided an inner expansible locking member releasably held in the chuck, and having an expansible end opening and over which expansible locking member, the outer locking member may be longitudinally moved forwardly to cause the forward fixed diameter end of said locking member to be longitudinally separated from said inner expansible locking member, thereby rendering it possible to insert the tool or unit to be joined, and thereby enlarging the diameter of said forward end of said expansible locking member to an extent which permits the shoulder of said tool or unit to be pressed through said expanded forward expansive opening of said expansive inner locking member. After which the outer locking member with its fixed diameter opening may be returned over said expansive locking member and cause its fixed opening to be positioned in register with said expansible forward end, which end is thereby held against expansion and the tool or unit shoulder be held forwardly of said opening.

The above mentioned general objects of my invention, together with others inherent in the same, are attained by the mechanism illustrated in the following drawings, throughout which like reference numerals indicate like parts:

Figure 1 represents the chuck or connector-coupler in side elevation with its main cooperating parts in assembled form;

Fig. 2 is an exploded view of said various members forming the chuck or connector-coupler, the same being separated longitudinally, that is, the parts are shown in elevation in position for being assembled longitudinally;

Fig. 3 is a plan view of the inner expansible locking member;

Fig. 4 is a view in longitudinal section showing the shank portion of a tool in engaged relation with the parts of the chuck or connector-coupler mounted on the fluid pressure engine, having a separate guide sleeve or tool adapter for receiving the end portion of a tool here illustrated in this figure as of hexagonal form;

Fig. 5 is a view in longitudinal section of the base member, showing a modified form of said sleeve or tool adapter integrally formed with the end portion of the engine and having exhaust ports therein;

Fig. 6 is a view in longitudinal section of a modified form of a base member securing a separately formed annular cylinder closing ring which ring also secures a replaceable bushing in which the end portion of the engine piston operates and an adapter without exhaust ports, the end portion of the tool here being illustrated as round;

Fig. 7 is a view in longitudinal section wherein the modified form of the end portion of the engine or motor has integrally formed therewith a short sleeve or tool adapter provided with exhaust ports;

Fig. 8 is a view in perspective of a modified form of an expansible locking member having the slots of tear-shaped form;

Fig. 9 is a fragmentary view in longitudinal section showing the outside locking member in operating position pulled forwardly to permit the expansion of the forward end of the expansible locking member in preparation for the inserting of the tool member;

Fig. 10 is a view of the parts of Fig. 9 showing the outside locking member reinforcing the forward end of the expansible member in locked position after the tool is inserted;

Fig. 11 is a view of the connector-coupler engaged with a modified form of tool-like member, namely, a hollow member or fitting for joining air conductors; and Fig. 12 is a view of a tool which may be employed in expanding the rear end portion of the expansible inner locking member for assembling the chuck or connector-coupler as may be required in repairing.

Referring to Figs. 1 and 2, there are four primary members comprising the chuck or connector-coupler of my invention and discovery, namely, (a) the base mounting member 10, (b) the securing spring 11 which resiliently holds the front parts of the chuck in assembly upon the rear or base member 10, (c) the interior expansible locking member 12, and (d) the shell, or outer shell locking member 13. The guide sleeve or tool adapter 14 (Fig. 5) preferably having a hexagonal opening 15 for some types of tools (other types of units to be held may use a round opening to provide for swivel action, see Fig. 6) is a member which may be formed integrally as the front end portion of the motor or engine 16 of the mechanism, or the same may be formed as a separate member. This sleeve 14 cooperatively functions in more positively holding the rear portion of the shank of the tool to be gripped as will be set forth more fully hereinafter.

The base member 10 functions primarily as a mounting member of other parts of the device and as the member for securing the chuck to the engine 16. It is preferably hollow, thereby providing a chamber 17 which functions to muffle the exhaust when the exhaust conduits lead thereto. Said base member 10 may have on the rear end portion an internal threaded section 18 for mounting the same upon the end portion of a compressed fluid engine 16. The base member 10 may have an intermediate bearing portion or shoulder 19 which contributes to the stiffening of the mechanism longitudinally. Said base member 10 is preferably provided with a cone shaped front portion 20 in applications of the device of my invention where same is to be used for securing tools to a reciprocating engine. Said base member 10 is provided with locking member which preferably is in the form of a circumferential locking groove 21 adjacent the front end portion of said cone, said groove forming part of the locking means hereinafter described. If desired, a set screw 22 may be employed in further securing the chuck upon the end portion of the fluid engine 16, or the same may be employed above without any threaded portion. Of course, the common practice of peening (i. e. bending over the metal bordering the set screw hole) may be done in locking the set screw 22 in place.

The next member longitudinally considered in assembling the chuck, Fig. 2, is the securing compression spring 11, preferably of a form having the degree of taper corresponding to the cone 20 of base 10. The parts against which the end portions of said spring bears are identified hereinafter. If there is no tapered cone forming the front part of the base member, then the spring may be straight.

The radially expansible locking member preferably of general cone shape preferably has its rear end 23 and its front end 24 in the form of a band. This front end band 24 provides an expansible opening 24a. Said locking member 12 also is provided with a slot 25 which preferably may extend longitudinally from end to end and an internally directed annular rib 26 on the rear end portion resiliently, interlockingly engageable in said annular locking groove 21 of said base member 10. Said rib 26 also functions as a bearing for the front end of said securing spring 11, said locking member having its front end portion formed of radially resilient segments or fingers 27. These resilient segments or fingers 27 may be formed by slots 28 issuing from holes 29 which function to augment the resiliency of said segments and also to prevent the slots from extending by cracking into the rear band 23 end portion. The front 24 bandlike end portion preferably has a rear shoulder 30, Figs. 4, 9 and 10, slightly curved to facilitate the removal of a tool, as well as a curved front shoulder 31 to facilitate the insertion and extraction of the tool from the chuck.

Said expansible locking member 12 may not have its rear end portion expansible but securable by being threaded upon the base member, or it may be secured thereon with a set screw, or, of course, the same may be welded.

An outer shell locking member 13 of hollow cylindrical form with preferably a cone-shaped front end portion 32 having, on its rear end portion, an annular mounting portion 33 registrable with the bearing shoulder 19 of said base member 10. Said outer shell locking member 13 also has adjacent said mounting portion 33, an internally directed annular rib or shoulder 34 which bears upon annular shoulder 35 and also functions to reinforce the rear end portion of outer shell locking member 13. Annular rib 34 also functions as a bearing for the rear end of said securing spring 11, which spring 11 also bears on its front end against rib 26. Accordingly, said spring 11 presses back on annular rib 34 holding outer shell locking member 13 securingly and resiliently on the bearing portion 19 of base member 10. Also, the rib 34 is preferably caused to augment the outer shell 13 in engagement with base member 10 by pressing against shoulder 35, thus causing a fast joint between the base member 10 and the shoulder 34 both circumferentially as respects bearing 19 and longitudinally by pressing against shoulder 34. Thus, there results a firm joint which rigidly longitudinally aligns the parts while being resiliently held by securing spring 11. The resilient holding of the spring 11 functions to insure the maintaining of the parts in assembled relation against the severe, rugged, disrupting vibrations of the engine and the tool.

Said outer shell locking member 13 has an internally directed front end face 36, registrable with the front end band portion 24 of the expansible locking member 12 when the chuck is in assembled form, said internally directed front end face 36 of outer shell locking member 13 forms a fixed diameter locking opening 37 of the outer shell locking member 13 when superimposed upon or around the said front end portion 24. The space between the shoulder 30 of inner locking member 12 and the shoulder 39 of the tool permits the tool to be reciprocated. When the front end band portion 24 of the expansible locking member 12 is engaged by the internal front end face 36 of the outer shell locking member 13, the said front band portion 24 is held securely in a non-expansive locking position within the fixed opening 37 of the outer shell locking member 13, thus positively blocking the releasing of a tool or unit 38 to be connected, said tool having a shoulder 39 which would be blockingly engaged by the front end band portion 24. Said outer shell locking member 13 with its cylindrical body rear portion forms with the cone-shaped front end portion 20 of the base 10, a chamber 40 in which said securing spring 11 is disposed. The inner face of the cone 32 of the outer locking shell 13 preferably bears directly upon the outer face 32a of the inner expansible locking member 12 or nearly bears thereon. (In the drawings a little space is allowed to show the separate faces.) Thus, the inside wall of conical portion 32 of the outer shell locking member 13 is disposed to positively function to prevent the shoulder or rib 26 from having any chance of lifting or springing out of locking position in groove 21 when the chuck is in locked position on the tool.

In sleeve 14, (see Fig. 4) longitudinally directed exhaust ducts 41 communicate with the exhaust ports of the engine leading the exhausting fluid into chamber 17 from which the exhausting fluid pass through ducts 42 into a chamber 40 in which spring 11 is disposed. From this chamber 40, the gases lead through holes 29 of inner expansible locking member 12 and thence through slots 28 and thence to the atmosphere.

In the modified form shown in Fig. 5 where the sleeve or tool adapter is integral with the engine, the same identical arrangement of the exhaust ducts obtains so that the same numbering of the ducts is applied.

In the modified form Fig. 6, the base member 50 has the cone-shaped member 51, and this cone portion is solid and has the axial tool opening 52. In this instance, the tool opening is round, to receive the shank 53 of a tool or unit 54 having shoulder 55. It will be understood that in some instances, it will be desirable to have the tool rotate as occurs in concrete drilling and other units such as cable couplings where it is desired to have a swivel connection. In other words, the form of the shank 53, whether it is round or hexagonal or otherwise, would depend upon the particular character of the work being done and the tool being used. In this modified form shown in Fig. 6, an annular ring 56 may be applied to act as a closure for the motor or engine cylinder 56a, and this ring 56 provides a bearing 57 for piston end 58 if used with a hammer form of an engine. It will be understood that ring 56 may be formed integrally with the end of the engine. Also, it will be understood that the chuck may be used where no motor or engine is involved, for instance, in the case of a mere coupling (see Fig. 11 for one example). In Fig. 6, it will be noted that no exhaust ducts are illustrated because this may be a form to be used with an engine where the exhaust ducts are provided independent of the chuck end. Of course, no such exhaust ducts are involved where the connector is used simply as a coupler.

In the modified form shown in Fig. 7, a short sleeve or adapter 60 is provided, and in this instance, integrally formed with the end of the engine 61. The front end 63 is extended down to bear upon the shank 64 of a tool or connector 65.

In Fig. 8 is illustrated a modified form of the inner expansible locking member 70, and such member 70 is characterized by having tear drop form of slots 71 forming resilient segments or fingers 72, particularly adapted in use of heavy tools. This form of the slots provides greater resiliency for the segments or fingers, and the modified form otherwise is similar in mode of operation to that of the said member 12.

In Fig. 9 is illustrated how the outer locking shell member 13 may be manually pulled forward from the locking position, that is, from registration of the inner face 36 with the front band-like member 24. By this separation of the face 36 of the fixed opening of the outer shell locking member 13 from the said front band-like portion 24 of the expansible locking member 12, it is next possible to insert the tool 38 having shoulder 39 which first engages the curved front shoulder 31 so that the expansible front end portion 24 is opened and expanded to permit the shoulder 39 to pass thereover as shown in Fig. 9 and fall in locking position behind shoulder 30 as the normal spring tension on members 27 of member 12 force the segments or fingers inwardly to normal locking position in the forming of normal sized opening 24a of Fig. 1. This normal sized opening of 24a is of a diameter which provides the outer circumference of 24a to fit or register within the internal diameter formed by face 36, that is, to fit in the fixed diameter opening (therefore non-expansible) of the outer shell locking member 13. The forwardly holding of the outer shell member 13 is now released and the securing spring 11 automatically returns the said outer shell member into locking position with respect to the front end portion 24 as shown in Fig. 10. It will be understood that the moving forward of the outer shell member 13 originally compressed the security spring 11 so that when the outer shell is released, the said security compression spring 11 automatically returns the outer shell member into locking position.

If the maximum advantages of the chuck of my invention are not desired, the resilient securing spring may be omitted, and the outer shell locking member may be secured to the base member by any one of several common practice fastening means such as common threaded arrangement, or bayonet type of fastener. However, the securing spring 11 provides a more secure locking (more positively holding against vibration) faster and is automatic in operation, and more economically as other means must be manually locked.

In Fig. 11 a modified form of the connector-coupler showing the tool-like member as a hollow member 80 attached to a flexible hose 81 for use as a fitting for joining a hose conduit 81 to the connector-coupler which, in turn, is mountable upon a fluid outlet. The base member 82 has circumferential groove 83, and in this type is shown without the forward end being of cone shape. Securing spring 84 functions to provide the resilient means as in case securing spring 11. Inner expansible locking member 85 functions as corresponding member 12, as it has the same general construction. It has internally directed rib 86 engageable in groove 83. Outer shell locking member 87 is substantially of cylindrical form but functions like its corresponding member 13.

This modified form shown in Fig. 11 is not only well adapted for use as a fluid connector-coupler but also for use in forming rods and cables where it is desirable to have the same quickly attachable and detachable, particularly in towing as in marine and aviation operations (starting gliders and mid-air refuelings).

In Fig. 12 is shown a tool 90 which may comprise a pair of pivoted members 91 and 92 joined in the form of a pair of pliers. In this case, however, the members operate to expand rather than to grip. The members 91 and 92 have turned up projections 93 and 94 of a size to fit the holes 29 of the inner locking member 12. The members 91 and 92 are illustrated in dotted line position in which position the tool may be inserted through the opening 24a after the tool 38 is removed and while the outer shell member 13 is in forward position as shown in Fig. 9. The two turned up projections 93 and 94 are then caused to engage holes 29 of the member 12, and the handle parts of 91 and 92 are then squeezed together which causes the projections 93 and 94 to engage holes 29 and expand the rear end portion of member 12 by increasing the width of the slot 25 which disengages the shoulder 26 from the groove 21, thereby permitting the member 12 together with the outer shell member 13 to be removed from the base member 10. This is one way of permitting the disassembling of the chuck in case of repair of changing parts.

*Mode of operation*

The mode of operation of the mechanism above described has been set forth in large measure together with the description of the construction. It is to be particularly noted that the chuck or connector-coupler of my invention, in its optimum combination of factors, is characterized by automatically locking the chuck upon the tool or unit to be held when the tool or unit to be held is inserted in the chuck. No separate operation is required of the operator in installing the device to lock the same. This provides for a positive and definite safety feature. By observing the location of the parts as shown in Figs. 9 and 10, it will be seen that the moving of the outer shell locking member 13 forwardly by reason of the compressibility of securing spring 11, that the forward end portion 24 of the expansible spring member 12 is no longer held in locking position as shown in Fig. 9. Thereupon as the tool 38 is inserted, its shoulder 39 forces the fingers or segments 27 to expand, there being nothing to prevent such expansion of the fingers by shoulder 39 as it is inserted inwardly, since face 36 is no longer confining the expansible forward end portion 24 of member 12. The segments or fingers 29 are freed from their expanded position after the shoulder 39 of the tool passes the curved shoulder 30 of the forward end portion 24 of the expansible member 12. The said segments or fingers are free to move inwardly in response to their normal bent position after said tool shoulder is moved past shoulder 30. This places the front end portion behind the shoulder 39 as shown in Fig. 10, thereupon the outer shell locking member 13 is manually released, and the securing spring 11 automatically returns the same to the locking position with respect to the front end portion 24 of the inner expansible locking member 12. This provides (see Fig. 3) a 360° shoulder on the part of the inner locking member 12 to engage the front edge of the shoulder 39 in preventing the tool or unit to be held from being released. The only part of the 360° engagement that is omitted is the very narrow slots 28. This forward end portion 24 is reinforced in its locking relation by the face 36 of the fixed opening of the outer shell locking member 13. This arrangement provides a locking means of very great strength against any unintentional discharge of the tool from the chuck.

Not only does the face 36 reinforce the locking of the front end portion 24, but the inner face 32 of the cone front end part 13 engages or bears upon the outer face 32a of the cone of the inner expansible locking member 12, thereby further reinforcing the said locking member 12 against any possible chance of expanding to let the shoulder 39 of the tool or unit to be held pass through the opening 24a of said inner locking member 12. Also, such reinforcement by the cone front end part 32 of member 13 functions further to maintain the rib 26 within the locking groove 21, thereby securely holding the front locking parts to the base member 10.

It will be noted that the locking means of my invention does not grip the tool or unit to be held, and thus permits said tool or unit to be free to reciprocate with respect to said tool or unit when the chuck is employed with reciprocating tools. The locking in the said chuck is positively and automatically accomplished by providing a fixed diameter opening and then providing an expansible member to be surrounded by the means forming said fixed diameter opening which is longitudinally movable to lock and unlock said expansible member. The said locking is preferably accomplished automatically to provide the optimum results of my invention. Said locking is secured by causing the front end portion of said expansible member to be located in a blocking position with respect to the shoulder of the tool or unit to be held.

The operation of fluid pressure devices are characterized by very definite and objectional exhaust noises. Often attempt is made to eliminate or reduce such noises by muffling features built in the engine or motor. In the chuck of my invention, I have further provided for a very definite elimination or reduction of these annoying noises incident to the exhaust. In the above description of the construction of the device, it was shown how the exhaust gases are led into different chambers where they may expand and are conducted into a circuitous route to the atmosphere, all of which has been found to very much alter and lessen the noise.

Obviously, changes may be made in the forms, designs and parts of my invention where the same have not been indicated as particularly advantageous, without departing from the principle thereof, the above setting forth primarily preferred forms of embodiment.

I claim:

1. A mechanism of the character described comprising a base mounting member having a longitudinal axial opening for the reception of the shank of a unit to be held; an inner expansible locking member releasably secured to said base mounting member and having a front end portion formed of a plurality of resilient longitudinally directed segments with slots therebetween forming an axial front end expansible opening; and an outer shell locking member releasably secured to said base member, having its body portion longitudinally movable over said inner expansible locking member and disposable in spaced, surrounding relation to the inner expansible locking member, thereby providing space in which said expansible locking member may expand, said front portion of said outer shell locking member having a fixed diameter opening registrable in superimposed locking position upon said expansible front end portion of said inner expansible locking member.

2. A mechanism of the character described comprising a base mounting member having a locking member and a longitudinal axial opening for the reception of the shank of a unit to be held; an inner expansible locking member having a rear end portion which has a member cooperatively engageable with said locking member of said base mounting member, a front end portion formed of a plurality of resilient longitudinally directed segments with slots therebetween forming an axial front end expansible opening; an outer shell locking member having rear and front end portions, said rear end portion having an inwardly directed shoulder releasably mounted on said base member, said outer shell locking member having its body portion in spaced relation to the inner expansible locking member, thereby providing space in which said expansible locking member may expand, said front portion having a fixed diameter opening registrable in superimposed locking position upon said expansible front end portion of said inner expansible locking member; and a resilient securing member for securing said outer shell locking member to the base mounting member, said securing member having rear and front end portions, said rear end portion bearing against said shoulder of the outer shell locking member, and said front end portion bearing against a portion of said expansible locking member.

3. A mechanism of the character described comprising a base mounting member having a locking member and a longitudinal axial opening for the reception of the shank of a unit to be held; an inner expansible locking member having an expansible rear end portion which has a member cooperatively engageable with said locking member of said base mounting member, a front end portion formed of a plurality of resilient longitudinally directed segments with slots therebetween forming an axial front end expansible opening; an outer shell locking member having rear and front end portions, said rear end portion having an inwardly directed shoulder releasably mounted on said base member, said outer shell locking member having its body portion in spaced relation to the inner expansible locking member, thereby providing space in which said expansible locking member may expand, said front portion having a fixed diameter opening registrable in superimposed locking position upon said expansible front end portion of said inner expansible locking member; and a resilient securing member for securing said outer shell locking member to the base mounting member, said securing member having rear and front end portions, said rear end portion bearing against said shoulder of the outer shell locking member, and said front end portion bearing against a portion of said expansible locking member.

4. A mechanism of the character described comprising a base mounting member having a locking groove and a longitudinal axial opening for the reception of the shank of a unit to be held; an inner expansible locking member having an expansible body, a rear end portion provided with an inwardly directed shoulder engageable within said locking groove of said base mounting member and a front end portion formed of a plurality of resilient longitudinally directed segments with slots therebetween forming an axial expansible opening; an outer shell locking member having rear and front end portions, said rear end portion having a shoulder and being releasably mounted on said base member, said outer shell locking member having its body portion in spaced relation to the inner expansible locking member, said front portion having a fixed opening registrable in superimposed locking position upon said front end portion of said inner expansible locking member; and a resilient securing member having rear and front end portions, said rear end portion bearing longitudinally against said shoulder of the outer shell locking member, and said front end portion bearing longitudinally against a portion of said inwardly directed shoulder of the expansible locking member.

5. A mechanism of the character described comprising a base mounting member having a locking groove and a longitudinal axial opening for the reception of the shank of a unit to be held; an inner expansible locking member having a rear end portion through which a longitudinal slot extends, said rear end portion being provided with an inwardly directed shoulder engageable with said locking groove of said base mounting member, and a front end portion formed of a plurality of resilient longitudinally directed segments with slots therebetween forming an axial expansible opening; an outer shell locking member having rear and front end portions, said rear end portion having a shoulder and being releasably mounted on said base member, said outer shell locking member having its body portion in spaced relation to the inner expansible locking member, said front portion having a fixed opening registrable in superimposed locking position upon said front end portion of said inner expansible locking member; and a resilient securing member having rear and front end portions, said rear end portion bearing longitudinally against said shoulder of the outer shell locking member, and said front end portion bearing longitudinally against a portion of said inwardly directed shoulder of the expansible locking member.

6. A mechanism of the character described comprising a base mounting member having a locking groove and a longitudinal axial opening for the reception of the shank of a unit to be held; an inner expansible locking member having an expansible body, a rear end portion provided with an inwardly directed shoulder engageable with said locking groove of said base mounting member, a body portion of cone form formed of a plurality of resilient longitudinally directed segments with slots therebetween forming an axial expansible opening; an outer shell locking member having rear and front end portions, said rear end portion having a shoulder and being releasably mounted on said base member, said outer shell locking member having its body portion in spaced relation to the inner expansible locking member, said front portion of cone form having a fixed opening registrable in superimposed locking position upon said front end portion of said inner expansible locking member, the inner face of the front end cone of the outer shell locking member engaging the outer face of the body cone of the expansible locking member when in locking position; and a resilient securing member having rear and front end portions, said rear end portion bearing longitudinally against said shoulder of the outer shell locking member, and said front end portion bearing longitudinally against a portion of said inwardly directed shoulder of the expansible locking member.

7. A mechanism of the character described comprising a base mounting member having a locking groove and a longitudinal axial opening for the reception of the shank of a unit to be held; an inner expansible locking member having an expansible rear end portion which has an inwardly directed shoulder cooperatively engageable with said locking member of said base mounting member and a body portion of cone shape having its front end portion of straight band form formed of a plurality of resilient longitudinally directed segments with slots therebetween forming an axial front end expansible opening; an outer shell locking member having rear and front end portions, said rear end portion having an inwardly directed shoulder releasably mounted in said groove of said base member, said outer shell locking member having its body portion in spaced relation to the inner expansible locking member thereby providing space in which said expansible locking member may expand, said front portion having a fixed diameter opening of straight band form registrable in superimposed locking position upon said expansible front end band portion of said inner expansible locking member; and a resilient securing member for securing said outer shell locking member to the base mounting member, said securing member having rear and front end portions, said rear end portion bearing against said shoulder of the outer shell locking member, and said front end portion bearing against a portion of said inwardly directed shoulder of the expansible locking member.

8. In a mechanism of the character described, an inner expansible locking member having a rear end portion which has a longitudinal slot providing for expansion thereof under tension and a cooperating locking member part by which said locking member is releasably held in assembled position, and a front end portion formed of a plurality of resilient longitudinally directed segments with slots therebetween forming an axial front end expansible opening.

9. In a mechanism of the character described, an inner expansible locking member having a rear end portion which has a cooperating locking member part by which said locking member is releasably held in locked assembled position, and a front end portion formed of a plurality of resilient longitudinally directed segments with slots therebetween forming an axial front end expansible opening; and an outer shell locking member disposed about said inner expansible locking member, said outer shell locking member having a fixed diameter front end opening fittingly surrounding said expansible front end formed by said segments when said outer shell member is moved longitudinally back in locking position upon said inner expansible locking member.

10. In a mechanism of the character described, an inner expansible locking member having an expansible rear end portion which has a cooperating locking member part by which said locking member is held in locked assembled position, and a front end portion formed of a plurality of resilient longitudinally directed segments with slots therebetween forming an axial front end expansible opening; an outer shell locking member disposed about said inner expansible locking member, said outer shell locking member having a fixed diameter front end opening fittingly surrounding said expansible front end formed by said segments when said outer shell member is moved longitudinally back in locking position upon said inner expansible locking member; and a compression spring having rear and front end portions, the said rear end portion bearing against the rear end portion of said outer shell member, and the front end portion bearing against the rear end portion of said inner expansible locking member.

11. In a mechanism of the character described, an inner expansible locking member having a rear end portion of slotted circumference provided with a cooperating locking member by which said expansible locking member is releasably held in locked assembled position, and a front end portion formed of a plurality of resilient longitudinally directed segments with slots of tear drop form therebetween, forming an axial front end expansible opening.

12. In a mechanism of the character described, an inner expansible locking member having an expansible rear end portion which has a cooperating locking member by which said locking member is detachably held in locked assembled position in the mechanism described, and a front end portion formed of a plurality of resilient longitudinally directed segments with slots of tear drop form therebetween, forming an axial front end expansible opening; and an outer shell locking member disposed about said inner expansible locking member, said outer shell locking member having a fixed diameter front end opening fittingly surrounding said expansible front end formed by said segments when said outer shell member is moved longitudinally back in locking position upon said inner expansible locking member.

13. In a mechanism of the character described, a slotted, expansible locking member having a slotted, expansible rear end portion which has an inwardly directed cooperating locking member by which said expansible locking member is held in locked assembled position, and a front end portion formed of a plurality of resilient longitudinally directed segments having openings from which slots extend through the forward end portion, thereby forming an axial front end expansible opening.

14. A mechanism of the character described, comprising a base member having an axial opening for the reception of a unit to be held; an inner locking member having one end portion releasably secured to said base mounting member and the other end portion having a radially expansible opening axially arranged with respect to said base member; and an outer locking member axially movable with respect to said base member opening, one end portion of said outer locking member being releasably secured to said base member and the other end portion thereof having a fixed diameter opening registrable in superimposed locking position upon the expansible end portion of said inner locking member.

15. A mechanism of the character described for automatically safety locking thereto a unit having a raised shoulder portion of predetermined dimension, comprising an outer shell-housing locking member having an annular collar of fixed diameter slightly greater than said predetermined dimension; an inner expansible locking member having one end portion of inner diameter slightly less than said predetermined dimension when said end portion is in register with said collar; a base member releasably mounting said outer and inner locking members; and compressible spring means arranged between said inner and outer locking members to releasably maintain said end portion of said inner expansible locking member in surrounded registration with said annular collar.

16. A mechanism according to claim 15, wherein said compressible spring means between said inner and outer locking members is arranged to exert its force in a direction generally parallel to the axis of the surface of registration between said collar and the said end portion of said inner expansible member.

References Cited in the file of this patent

UNITED STATES PATENTS

| | | |
|---|---|---|
| 279,196 | Smith | June 12, 1883 |
| 864,671 | Myers | Aug. 27, 1907 |
| 1,250,645 | Perry | Dec. 18, 1917 |
| 1,345,495 | Karles | July 6, 1920 |
| 1,387,493 | Keller et al. | Aug. 16, 1921 |
| 1,603,217 | Shaff | Oct. 12, 1926 |
| 2,453,741 | Bopp | Nov. 16, 1948 |

FOREIGN PATENTS

| | | |
|---|---|---|
| 107,909 | Sweden | July 13, 1943 |